(12) United States Patent
Chen et al.

(10) Patent No.: US 9,185,675 B2
(45) Date of Patent: Nov. 10, 2015

(54) METHOD AND APPARATUS FOR CLASSIFYING A MOBILE DEVICE LOCATION

(71) Applicant: QUALCOMM Incorporated, San Diego, CA (US)

(72) Inventors: Jiajian Chen, San Jose, CA (US); Yin Chen, Campbell, CA (US); Hui Chao, San Jose, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 14/083,258

(22) Filed: Nov. 18, 2013

(65) Prior Publication Data

US 2015/0141035 A1    May 21, 2015

(51) Int. Cl.
*H04W 64/00* (2009.01)
*G01S 19/13* (2010.01)
*G01S 19/39* (2010.01)
*G01S 19/48* (2010.01)

(52) U.S. Cl.
CPC ............... *H04W 64/00* (2013.01); *G01S 19/13* (2013.01); *G01S 19/39* (2013.01); *G01S 19/48* (2013.01)

(58) Field of Classification Search
CPC combination set(s) only.
See application file for complete search history.

(56) References Cited

U.S. PATENT DOCUMENTS

| | | | |
|---|---|---|---|
| 6,199,012 B1 | 3/2001 | Hasegawa | |
| 6,965,760 B1 | 11/2005 | Chen et al. | |
| 7,194,275 B2 | 3/2007 | Bolin et al. | |
| 7,925,995 B2 | 4/2011 | Krumm et al. | |
| 8,106,818 B2 | 1/2012 | Bhattacharya et al. | |
| 8,467,805 B2 | 6/2013 | Harper | |
| 8,489,122 B2 | 7/2013 | Gravely et al. | |
| 8,532,024 B2 | 9/2013 | Arpee et al. | |
| 8,548,492 B2 | 10/2013 | Islam et al. | |
| 8,954,267 B2 | 2/2015 | Khorashadi et al. | |
| 2002/0196188 A1 | 12/2002 | Holt | |
| 2004/0096083 A1 | 5/2004 | Matsunaga et al. | |
| 2009/0132163 A1 | 5/2009 | Ashley, Jr. et al. | |
| 2010/0121567 A1 | 5/2010 | Mendelson | |
| 2011/0081919 A1 | 4/2011 | Das et al. | |
| 2011/0087431 A1* | 4/2011 | Gupta et al. | 701/207 |
| 2011/0103360 A1 | 5/2011 | Ku et al. | |
| 2011/0190004 A1 | 8/2011 | Tenny et al. | |
| 2012/0015665 A1 | 1/2012 | Farley et al. | |
| 2012/0072106 A1* | 3/2012 | Han et al. | 701/410 |

(Continued)

FOREIGN PATENT DOCUMENTS

WO    2011047310 A1    4/2011

OTHER PUBLICATIONS

Co-pending U.S. Appl. No. 13/773,309, filed Feb. 21, 2013.

(Continued)

*Primary Examiner* — Wesner Sajous
(74) *Attorney, Agent, or Firm* — Hunter Clark PLLC

(57) ABSTRACT

Methods, apparatus, and computer program products for classifying a mobile device location are described. An example of a method for classifying the mobile device location includes mapping the mobile device location to a pixel address in a dilated test texture, wherein the dilated test texture corresponds to an uncertainty estimation associated with the mobile device location and determining an in-out classification of the mobile device location based on a query of a pixel value associated with the pixel address in the dilated test texture.

26 Claims, 12 Drawing Sheets

(56) References Cited

U.S. PATENT DOCUMENTS

| | | | |
|---|---|---|---|
| 2012/0225663 | A1 | 9/2012 | Gupta et al. |
| 2012/0242798 | A1* | 9/2012 | McArdle ......... H04N 21/23412 348/46 |
| 2012/0254804 | A1 | 10/2012 | Sheha et al. |
| 2013/0030747 | A1 | 1/2013 | Ganick et al. |
| 2013/0322767 | A1* | 12/2013 | Chao ................... G06K 9/4604 382/199 |
| 2014/0243017 | A1* | 8/2014 | Das et al. ................... 455/456.2 |
| 2014/0274138 | A1* | 9/2014 | Chao et al. ................ 455/456.3 |
| 2014/0341475 | A1* | 11/2014 | Shen et al. .................... 382/218 |
| 2015/0038171 | A1* | 2/2015 | Uilecan et al. ............ 455/456.3 |
| 2015/0080020 | A1* | 3/2015 | Edge ......................... 455/456.1 |
| 2015/0087238 | A1* | 3/2015 | Palanki et al. ............. 455/67.11 |
| 2015/0098442 | A1* | 4/2015 | Shatsky et al. ................ 370/331 |

OTHER PUBLICATIONS

Co-pending U.S. Appl. No. 13/791,358, filed Mar. 8, 2013.
Setiya R., et al., "Fingerprinting based Localization of Mobile Terminals using IEEE802.11," World Journal of Science and Technology, 2012, vol. 2 (3), pp. 111-114.
International Search Report and Written Opinion—PCT/US2014/060566—ISA/EPO—Feb. 3, 2015, 8 pgs.

\* cited by examiner

METHOD AND APPARATUS FOR CLASSIFYING A MOBILE DEVICE LOCATION

BACKGROUND

An accurate and fast in-out classification of a mobile device location is beneficial for many mobile device navigation applications. The in-out classification can classify the mobile device location as "in" or "out" of an indoor area by comparing a location determined, for example, by a global navigation satellite system (GNSS) (e.g., global positioning system (GPS)) with mapping information for the indoor area. The results of the in-out classification may determine a preferred location determination method. For example, GNSS based positioning may be preferred if the mobile device location is classified as "out" of the indoor area and Wi-Fi based positioning may be preferred if the mobile device location is classified as "in" the indoor area.

SUMMARY

An example of a method of classifying a mobile device position according to the disclosure may include mapping the mobile device location to a pixel address in a dilated test texture, wherein the dilated test texture corresponds to an uncertainty estimation associated with the mobile device location and determining an in-out classification of the mobile device location based on a query of a pixel value associated with the pixel address in the dilated test texture.

Implementations of such a method may include one or more of the following features. The method may include receiving the mobile device location and the uncertainty estimation. The method may include determining the mobile device location and the uncertainty estimation. The dilated test texture may be a morphologically dilated test texture. The method may include obtaining mapping information for an indoor area, rasterizing the mapping information, texture mapping the rasterized mapping information to generate a test texture, and dilating the test texture based on the uncertainty estimation to generate the dilated test texture. The method may include determining a structuring element based on the uncertainty estimation and dilating the test texture using the structuring element. The mapping information may comprise level information for multiple levels of the indoor area. The method may include rasterizing the level information, combining the rasterized level information, and texture mapping the combined rasterized level information to generate the test texture. The level information may include roof information. The method may include retrieving, from a memory device and based on the uncertainty estimation, the dilated test texture.

An example of an apparatus for classifying a mobile device position according to the disclosure may include one or more processors configured to map the mobile device location to a pixel address in a dilated test texture, wherein the dilated test texture corresponds to an uncertainty estimation associated with the mobile device location and determine an in-out classification of the mobile device location based on a query of a pixel value associated with the pixel address in the dilated test texture.

Implementations of such an apparatus may include one or more of the following features. The one or more processors may be configured to receive the mobile device location and the uncertainty estimation. The one or more processors may be configured to determine the mobile device location and the uncertainty estimation. The dilated test texture may be a morphologically dilated test texture. The one or more processors may be configured to obtain mapping information for an indoor area, rasterize the mapping information, texture map the rasterized mapping information to generate a test texture, and dilate the test texture based on the uncertainty estimation to generate the dilated test texture. The one or more processors may be configured to determine a structuring element based on the uncertainty estimation and dilate the test texture using the structuring element. The mapping information may comprise level information for multiple levels of the indoor area. The one or more processors may be further configured to rasterize the level information, combine the rasterized level information, and texture map the combined rasterized level information to generate the test texture. The level information may include roof information. The one or more processors may be configured to retrieve, from a memory device and based on the uncertainty estimation, the dilated test texture. The one or more processors may include at least one graphics processing unit. The one or more processors may be configured to execute computer readable instructions including one or more code modules of a graphics pipeline.

An example of an apparatus for in-out classification of a mobile device position according to the disclosure may include means for mapping the mobile device location to a pixel address in a dilated test texture, wherein the dilated test texture corresponds to an uncertainty estimation associated with the mobile device location and means for determining an in-out classification of the mobile device location based on a query of a pixel value associated with the pixel address in the dilated test texture.

Implementations of such an apparatus may include one or more of the following features. The apparatus may include means for receiving the mobile device location and the uncertainty estimation. The apparatus may include means for determining the mobile device location and the uncertainty estimation. The apparatus may include means for obtaining mapping information for an indoor area, means for rasterizing the mapping information, means for texture mapping the rasterized mapping information to generate a test texture, and means for dilating the test texture based on the uncertainty estimation to generate the dilated test texture. The apparatus may include means for determining a structuring element based on the uncertainty estimation and means for dilating the test texture using the structuring element. The mapping information may comprise level information for multiple levels of the indoor area. The apparatus may include means for rasterizing the level information, means for combining the rasterized level information, and means for texture mapping the combined rasterized level information to generate the test texture. The apparatus may include means for retrieving, from a memory device and based on the uncertainty estimation, the dilated test texture. The apparatus may include means for executing computer readable instructions including one or more code modules of a graphics pipeline An example of a computer program product residing on a processor-readable non-transitory storage medium according to the disclosure may include processor-readable instructions executable by one or more processors to map the mobile device location to a pixel address in a dilated test texture, wherein the dilated test texture corresponds to an uncertainty estimation associated with the mobile device location and determine an in-out classification of the mobile device location based on a query of a pixel value associated with the pixel address in the dilated test texture.

Implementations of such a computer program product may include one or more of the following features. The computer program product may include processor readable instructions executable by the one or more processors to receive the mobile device location and the uncertainty estimation. The computer program product may include processor readable instructions executable by the one or more processors to determine the mobile device location and the uncertainty estimation. The computer program product may include processor readable instructions executable by the one or more processors to obtain mapping information for an indoor area, rasterize the mapping information, texture map the rasterized mapping information to generate a test texture, and dilate the test texture based on the uncertainty estimation to generate the dilated test texture. The computer program product may include processor readable instructions executable by the one or more processors to determine a structuring element based on the uncertainty estimation and dilate the test texture using the structuring element. The mapping information may comprise level information for multiple levels of the indoor area. The computer program product may include processor readable instructions executable by the one or more processors to rasterize the level information, combine the rasterized level information, and texture map the combined rasterized level information to generate the test texture. The computer program product may include processor readable instructions executable by the one or more processors to retrieve, from a memory device and based on the uncertainty estimation, the dilated test texture. The computer program product may include processor readable instructions executable by the one or more processors to execute computer readable instructions including one or more code modules of a graphics pipeline An example of a method of in-out classification of a mobile device location according to the disclosure may include sending the mobile device location and an uncertainty estimation associated with the mobile device location and receiving an in-out classification of the mobile device location wherein the in-out classification of the mobile device is based on a query of a pixel value in a dilated test texture.

Implementations of such a method may include one or more of the following features. The dilated test texture may be a morphologically dilated test texture. The dilated test texture may correspond to the uncertainty estimation. The dilated test texture may be generated based on a structuring element determined by the uncertainty estimation. The mobile device location may correspond to a pixel address, associated with the queried pixel value, in the dilated test texture. The dilated test texture may be generated from level information for multiple levels of an indoor area. The level information may include roof information The morphologically dilated test texture may be retrieved, from a memory device, based on the uncertainty estimation.

An example of an apparatus for in-out classification of a mobile device location according to the disclosure may include one or more processors configured to send the mobile device location and an uncertainty estimation associated with the mobile device location and receive an in-out classification of the mobile device location wherein the in-out classification of the mobile device is based on a query of a pixel value in a dilated test texture Implementations of such an apparatus may include one or more of the following features. The dilated test texture may be a morphologically dilated test texture. The dilated test texture may correspond to the uncertainty estimation. The dilated test texture may be generated based on a structuring element determined by the uncertainty estimation. The mobile device location may correspond to a pixel address, associated with the queried pixel value, in the dilated test texture. The dilated test texture may be generated from level information for multiple levels of an indoor area. The level information may include roof information. The morphologically dilated test texture may be retrieved, from a memory device, based on the uncertainty estimation.

An example of an apparatus for in-out classification of a mobile device position according to the disclosure may include means for sending the mobile device location and an uncertainty estimation associated with the mobile device location and means for receiving an in-out classification of the mobile device location wherein the in-out classification of the mobile device is based on a query of a pixel value in a dilated test texture.

An example of a computer program product residing on a processor-readable non-transitory storage medium according to the disclosure may include processor-readable instructions executable by one or more processors to send the mobile device location and an uncertainty estimation associated with the mobile device location and receive an in-out classification of the mobile device location wherein the in-out classification of the mobile device is based on a query of a pixel value in a dilated test texture.

These and other capabilities of the invention, along with the invention itself, will be more fully understood after a review of the following figures, detailed description and claims. Other capabilities may be provided and not every implementation according to the disclosure must provide any, let alone all, of the capabilities discussed. Further it may be possible for an effect noted above to be achieved by means other than that noted and a noted item/technique may not necessarily yield the noted effect.

BRIEF DESCRIPTIONS OF THE DRAWINGS

In the appended figures, similar components and/or features may have the same reference label. Further, various components of the same type may be distinguished by following the reference label with a dash and a second label that distinguished among the similar components. If only the first reference label is used in the specification, the description is applicable to any one of the similar components having the same first reference label irrespective of the second reference label.

DETAILED DESCRIPTION

Embodiments of the invention provide techniques for classifying a mobile device location as inside or outside of an indoor area using hardware implemented algorithms which include morphological processing routines. The techniques discussed below are examples, however, and not limiting of the invention as other implementations in accordance with the disclosure are possible. The described techniques may be implemented as a method, apparatus, or system and can be embodied in computer-readable media.

A GNSS based location of a mobile device is mapped to a pixel address in a dilated test texture. The dilated test texture is generated by obtaining mapping information for an indoor area, rasterizing the mapping information, texture mapping the rasterized mapping information, and morphologically dilating the test texture to generate the dilated test texture. The dilation is implemented in a graphics pipeline of a graphics processing unit (GPU) using a structuring element based on the associated uncertainty estimation. The in-out classification of the GNSS position is determined based on a query of a pixel value associated with the pixel address in the dilated test texture.

An in-out classification algorithm may classify the GNSS based position of the mobile device as inside or outside relative to an indoor area. However, the uncertainty associated with the GNSS based positions can contribute to inaccuracy of the in-out classification. Incorporating the uncertainty associated with GNSS based positions into the in-out classification may improve the accuracy of the in-out classification with regard to determining the preferred positioning method for a given geographic mobile device location.

Particular geographic locations of a mobile device relative to an indoor environment can contribute to the uncertainty associated with the GNSS based position due to the configuration of the satellite signals relative to the geometry of the indoor environment. Some examples of such geographic locations are shown in FIGS. 1A and 1B.

Figure 1A:
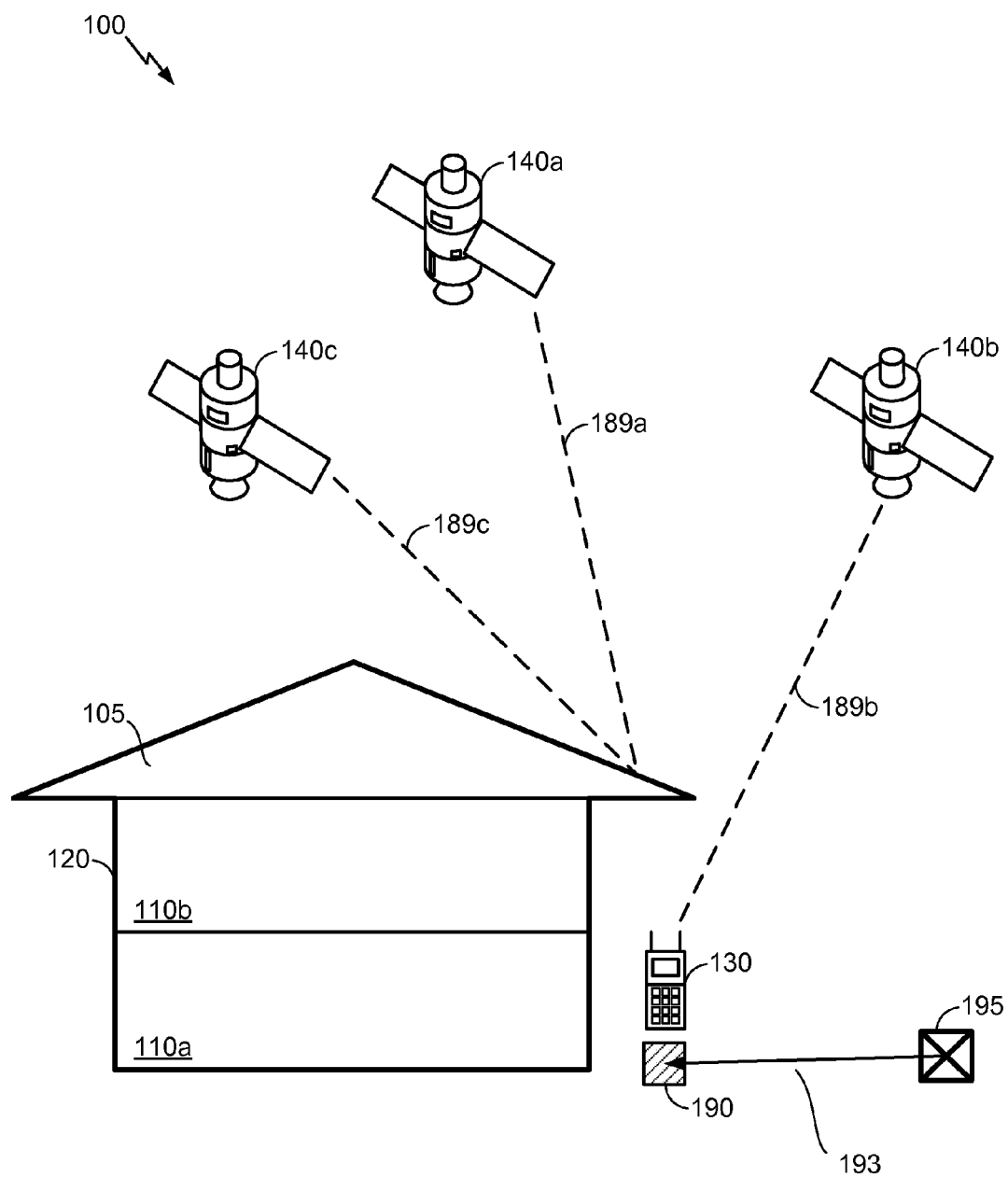
FIG. 1A is a schematic diagram of a mobile device positioning scenario in the vicinity of an indoor area receiving GNSS signals partially obstructed by the roof of the indoor area.
Figure 1B:
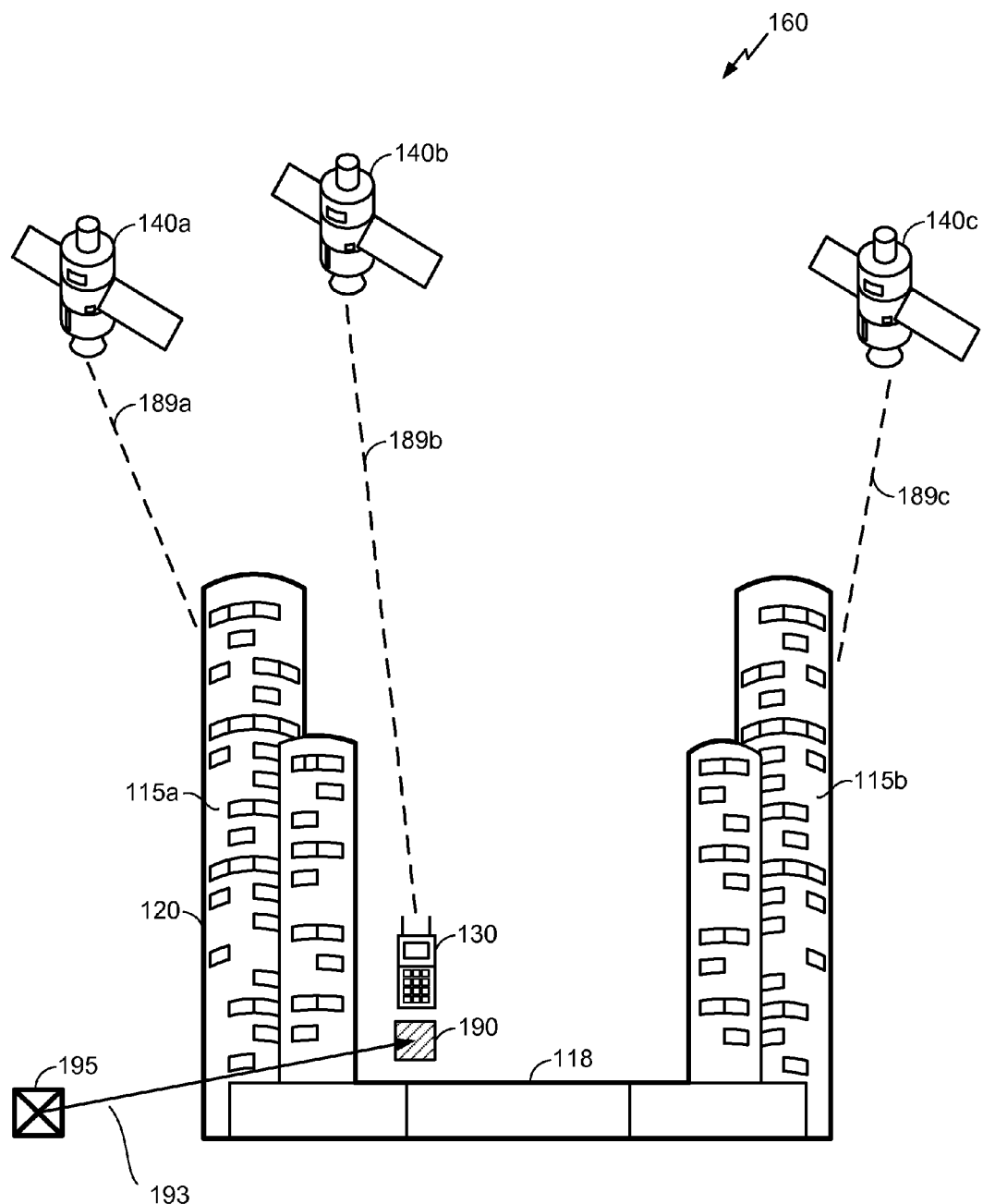
FIG. 1B is a schematic diagram of a mobile device positioning scenario in the vicinity of an indoor area receiving GNSS signals partially obstructed by the towers of the indoor area.

Referring to FIG. 1A, a side view of a mobile device positioning scenario 100 is shown. Scenario 100 depicts a mobile device in the vicinity of an indoor area receiving GNSS signals partially obstructed by a roof of the indoor area. The scenario 100 is an example and not limiting and may be altered, e.g., by having components added, removed, or rearranged. The number of satellites 140, satellite signals 189, and levels 110, as shown in FIG. 1A, are examples and not limiting of the invention.

The indoor area can include multiple levels 110a and 110b (collectively sometimes referred to as levels 110). The multiple levels may include at least one roof 105. The physical exterior boundary 120 of the indoor area is indicated as a thick black line. In this example, the mobile device 130 may be located at a physical location 190 outside of the physical exterior boundary 120 of the indoor area. In an implementation, the physical location 190 may be a long-term location of a stationary mobile device (e.g., a user standing at physical location 190 and utilizing the mobile device 130). In an alternative implementation, the physical location 190 may be a short-term location of the mobile device 130 in transit from outside of the indoor area to inside of the indoor area or vice versa (e.g., a user utilizing the mobile device 130 while walking between a parking lot and a building).

At physical location 190, mobile device 130 may receive one or more satellite signals 189a, 189b, and 189c (collectively sometimes referred to as satellite signals 189) from one or more respective satellites 140a, 140b, and 140c (collectively sometimes referred to as satellites 140) and determine a GNSS based position 195. However, the roof 105 may block, obstruct, shade, or otherwise interfere with the line-of-sight for the one or more satellite signals 189. The obstructed or partially obstructed satellite signals may contribute to the uncertainty estimation 193 associated with the GNSS based position 195.

The GNSS based position 195 may be expressed in terms of latitude and longitude and the uncertainty estimation 193 (e.g., an error estimate) can be a distance range (e.g., a discrete number of feet or meters). The uncertainty estimation 193 may not be limited to any particular spatial plane or direction and can extend radially in any direction from the GNSS based position 195. In various implementations, the uncertainty estimation 193 can determine the radius of an uncertainty polygon in three dimensions (e.g., a sphere) or an uncertainty polygon in two dimensions (e.g., a circle), both centered on the GNSS based position 195.

Referring to FIG. 1B, a side view of a mobile device positioning scenario 160 is shown. Scenario 160 depicts a mobile device in the vicinity of an indoor area receiving GNSS signals partially obstructed by towers of the indoor area. The scenario 160 is an example and not limiting and may be altered, e.g., by having components added, removed, or rearranged. The indoor area may include towers 115a and 115b (collectively sometimes referred to as towers 115) and a courtyard 118. The number of towers 115 is an example and not limiting of the invention. The physical exterior boundary 120 of the indoor area is indicated as a thick black line. As an example, the mobile device 130 can be located at a physical location 190 in the courtyard 118 but outside of the physical exterior boundary 120 of the indoor area. As discussed above, the physical location 190 may be a short-term or long-term location. The towers 115 may block, obstruct, shade, or otherwise interfere with the line-of-sight for one or more satellite signals 189 from one or more respective satellites 140 for GNSS based positioning. The obstructed satellite signals may contribute to the uncertainty estimation 193 associated with the GNSS based position 195.

Figure 2:
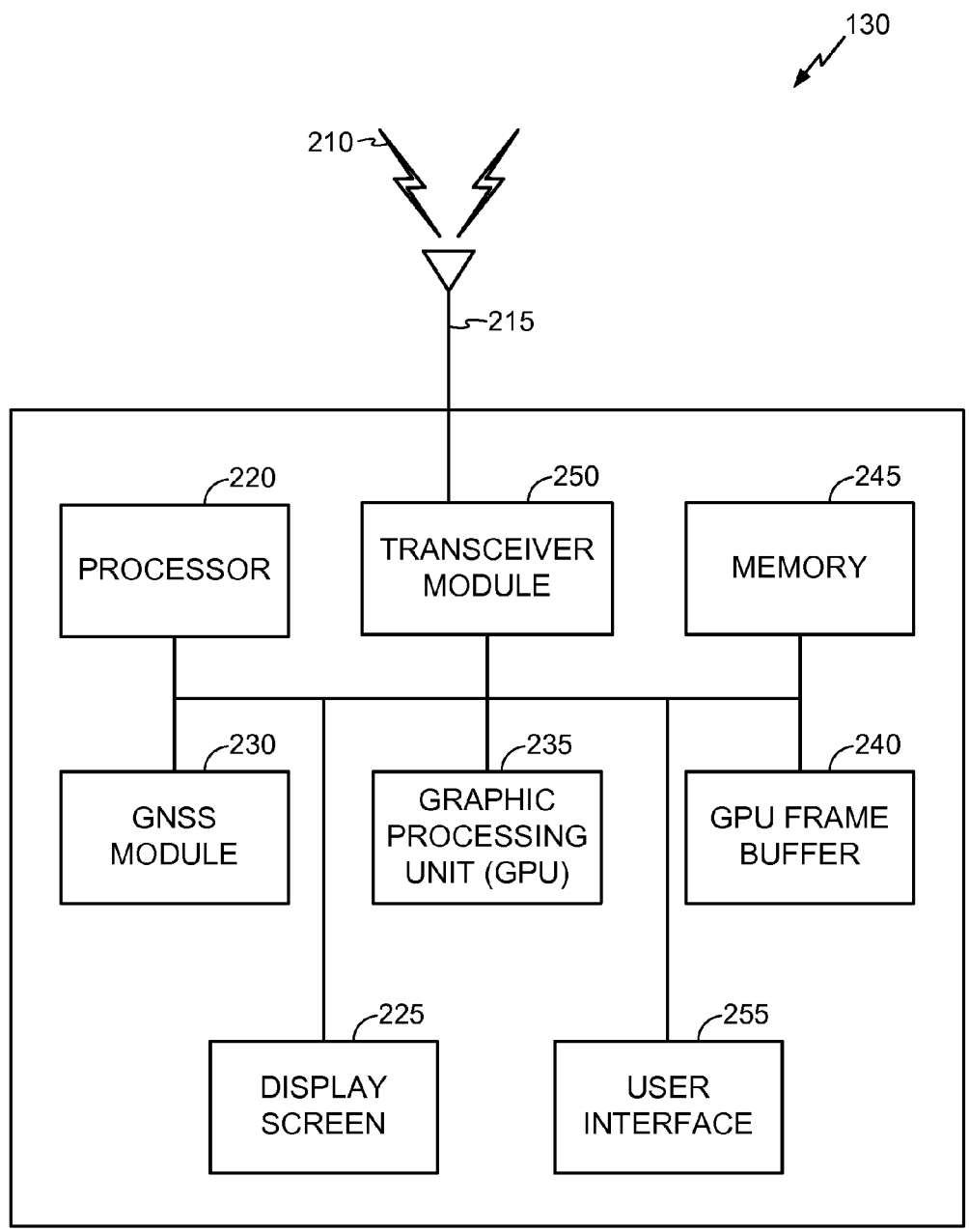
FIG. 2 is a schematic diagram of system components of a mobile device configured to implement in-out classification.

Referring to FIG. 2, a schematic diagram is shown of a mobile device 130 configured to implement in-out classification. The mobile device 130 is intended to be representative of any electronic device that may be reasonably moved about by a user. Examples of the mobile device 130 may include, but are not limited to, a mobile station, a mobile phone, a smartphone, a user equipment, a netbook, a laptop computer, a tablet or slate computer, an entertainment appliance, a navigation device and any combination thereof. Claimed subject matter is not limited to any particular type, category, size, capability etc. of mobile device.

In an embodiment, components of the mobile device 130 include a transceiver module 250, a wireless antenna 215, a GNSS module 230, a processor 220, a memory 245, a graphics processing unit (GPU) 235, a GPU frame buffer 240, a display screen 225, and a user interface 255. The user interface 255 can include any type of user input device (not shown) including, for example, a keypad, a touchscreen, or a microphone. The display screen 225 may comprise a liquid crystal display (LCD), a cathode ray tube (CRT) display, an organic light emitting diode (OLED) display, a plasma display, or any other type of display device. While only one of each mobile device component is shown in FIG. 2, more than one of any of these components could be part of the mobile device 130. The mobile device 130 is an example and not limiting and may be altered, e.g., by having components added, removed, or rearranged.

The wireless transceiver module 250 can send and receive wireless signals 210 via a wireless antenna 215 over one or more wireless networks, as discussed below with regard to FIG. 3. The mobile device 130 is illustrated as having a single transceiver module 250. However, a mobile device 130 can alternatively have multiple transceiver modules 250 and antennas 215 to support multiple communication standards such as Wi-Fi, Code Division Multiple Access (CDMA), Wideband CDMA (WCDMA), Long Term Evolution (LTE), Bluetooth, etc.

The processor 220 can be an intelligent hardware device, e.g., a central processing unit (CPU) such as those made by ARM®, INTEL® Corporation, or AMD®, a microcontroller, an application specific integrated circuit (ASIC), etc. The processor 220 can, but need not necessarily include, one or more microprocessors, embedded processors, controllers, ASICs, digital signal processors (DSPs) and the like. The term processor is intended to describe the functions implemented by the system rather than specific hardware. The processor 220 could comprise multiple separate physical entities that can be distributed in the mobile device 130. The memory 245 can store information, including but not limited to information from the wireless signals 210. The memory 245 includes a non-transitory computer-readable storage medium (or media) that stores functions as one or more instructions or code. The term memory, as used herein, refers generally to any type of computer storage medium, including but not limited to RAM, ROM, FLASH, disc drives, etc. Memory 245 may be long term, short term, or other memory associated with the mobile device 130 and is not to be limited to any particular type of memory or number of memories, or type of media upon which memory is stored. Functions stored by the memory 245 may be executed by the processor 220, the GNSS module 230, the transceiver module 250, the GPU 235, and the GPU frame buffer 240. Thus, the memory 245 is a processor-readable memory and/or a computer-readable memory that stores software code (programming code, instructions, etc.) configured to cause the processor 220, the GNSS module 230, the transceiver module 250, the GPU 235, and the GPU frame buffer 240 to perform the functions described. Alternatively, one or more functions of the mobile device 130 may be performed in whole or in part in hardware.

The GNSS module 230 includes appropriate equipment for monitoring GNSS signals from satellites used to determine the GNSS based position and the associated uncertainty estimation for the mobile device 130. Although shown as a separate entity in FIG. 2, in an embodiment, the GNSS module 230 may be part of the processor 220. The GNSS module 230 can include one or more GNSS antennas (not shown) and one or more processors (not shown). In an embodiment, the GNSS module 230 can process the satellite signal information and determine the GNSS based position for the mobile device 130 and the associated uncertainty estimation 193. In an embodiment, the GNSS module 230 may store the GNSS based position and associated uncertainty estimation 193 in the memory 245 for use by the processor 220 and the GPU 235. In an embodiment, the mobile device 130 may send the GNSS based position and associated uncertainty estimation 193 to another network entity. In an embodiment, the GNSS module 230 may determine the GNSS based position and receive the associated uncertainty estimation 193 for the determined GNSS based position from another network entity. In an embodiment, the GNSS module 230 may send satellite signal measurements to another network entity (e.g., a positioning server, network server, or network access point as discussed below with regard to FIG. 3) and receive the GNSS based position and the associated uncertainty estimation 193 from the network entity.

The associated GNSS uncertainty estimation may be measured, calculated, retrieved from a database, or otherwise determined. The determination may account for parameters affecting satellite signals including, for example, atmospheric disturbances, signal reflection, ephemeris errors, and clock errors. In an implementation, the GNSS module 230 may monitor GNSS signals from satellites at multiple known physical locations in, out, or on the perimeter of the indoor area. A comparison of each GNSS based position determined from the GNSS signals with the respective known physical location may determine the uncertainty estimation 193 empirically for each GNSS based position. In an embodiment, GNSS satellite and signal information may be combined with indoor area geometry information to determine the associated uncertainty estimation 193. Indoor area geometry information may include, for example, the layout, area, and height of the exterior boundary, the layout, area, and height of the roof, the proximity, area, and height of multiple structures within the exterior boundary, and the latitude and longitude of the indoor area.

The GPU 235 can be a graphics rendering device configured to implement graphics processing routines to generate a rasterized image. Examples of GPU 235 include, but are not limited to, a digital signal processor (DSP), a general purpose microprocessor, an application specific integrated circuit (ASIC), a field programmable logic array (FPGA), or another equivalent integrated or discrete logic circuitry. The GPU 235 can perform at least the graphics processing routines functions, as described in detail below, using parallel processing. Parallel processing can allow the GPU 235 to process a relatively large amount of data at a faster computational speed than would be possible with, for example, a central processing unit (CPU). Faster computational speed can enable in-out classification of mobile device locations with reduced impact on bandwidth and mobile device power consumption. In various implementations, the graphics processing routines may be implemented in GPU 235 and/or processor 220 as software, firmware, one or more hardware units, or any combination thereof. The GPU 235 may store the generated rasterized image as a bitmap in the GPU frame buffer 240 and/or in memory 245. The GPU frame buffer 240 includes a set of frame buffer addresses (i.e., pixel addresses). The GPU frame buffer 240 may comprise an on-chip buffer that may be part of the same integrated circuit, or chip, as the GPU 235. The GPU frame buffer 240 is communicatively coupled to the GPU 235 and to the processor 220. In an embodiment, the rasterized image may be stored in memory 245. The rasterized image may be a displayable image and may be displayed on a display screen, for example, display screen 225.

Figure 3:
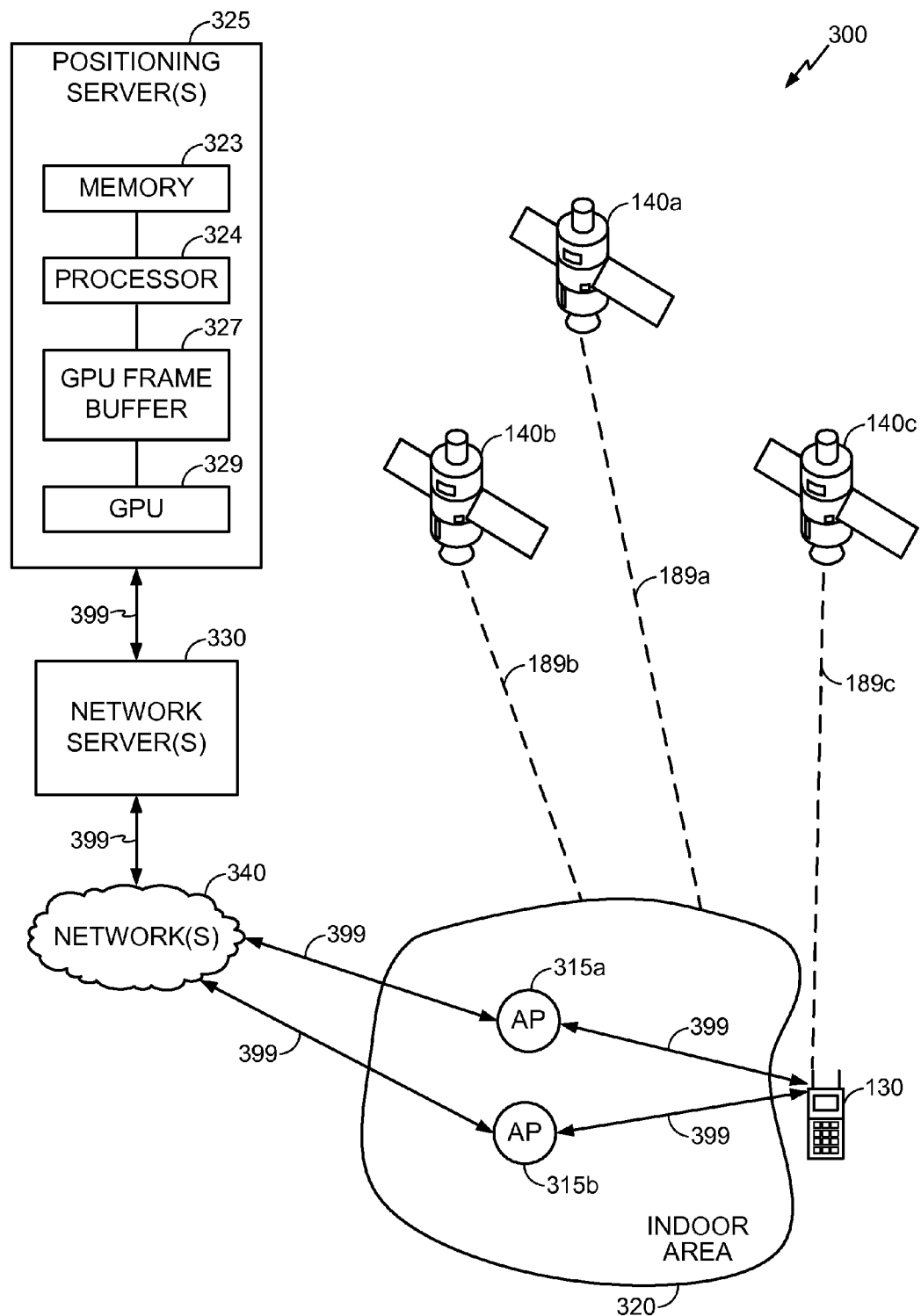
FIG. 3 is a schematic diagram of components of a mobile device positioning system.

Referring to FIG. 3, with further reference to FIGS. 1A, 1B, 2, and 4, a schematic diagram of components of a mobile device positioning system 300 is shown. The system 300 is an example and not limiting and may be altered, e.g., by having components added, removed, or rearranged. In an embodiment, the system 300 can include a mobile device 130, one or more network server(s) 330, a network 340, GNSS system satellites 140, an indoor area 320, one or more positioning server(s) 325, and one or more APs, 315a and 315b (collectively sometimes referred to as APs 315) located inside, outside, or on the perimeter of the indoor area 320. The system 300 may include multiple mobile devices 130 and multiple indoor areas 320. In FIG. 3, mobile device 130 is shown outside of the indoor area 320, by way of example, but may be located inside, outside, or on the perimeter of the indoor area 320.

Figure 4:
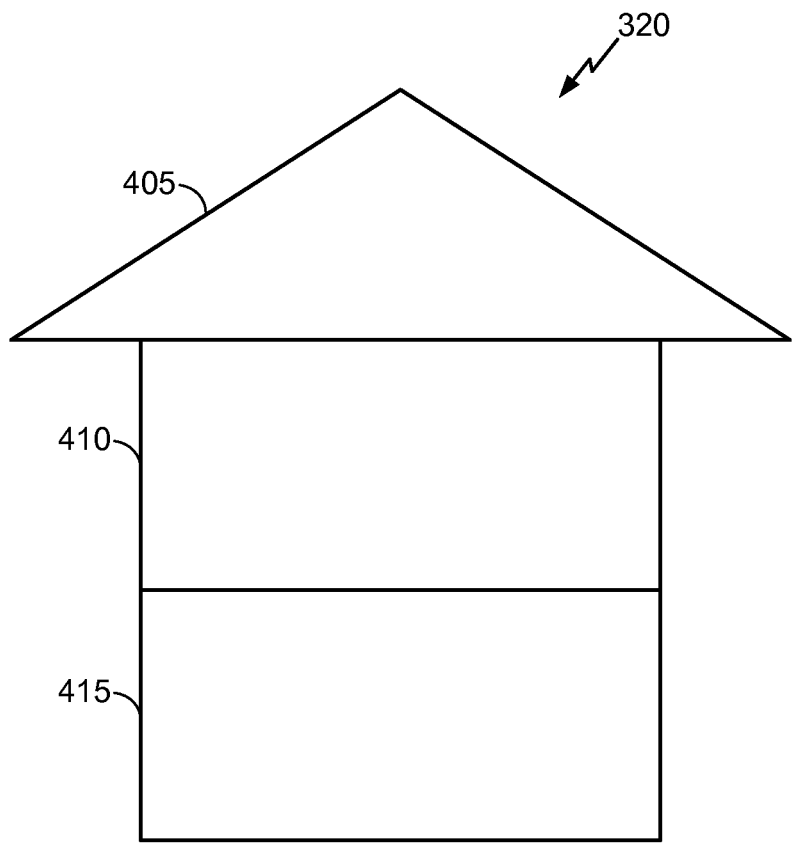
FIG. 4 is a schematic diagram of a side view of multiple levels of an indoor area.

The indoor area 320 may be a structure including, for example, but not limited to, a school, an office building, a residential building, a store, a stadium, an arena, a convention center, a mall, a collection of buildings connected by tunnels, bridges, walkways, etc., an airport terminal, and any combinations or sub-sections thereof. In an implementation, the indoor area 320 can include multiple levels and may include at least one roof. For example, referring to FIG. 4, a side view of indoor area 320 is shown with multiple levels, 405, 410 and 415. Level 405 can be a roof. The number, shape, and arrangement of levels including the roof shown in FIG. 4 are an example and not limiting of the invention. In various embodiments, indoor area 320 may include a single level and roof or any number of levels and roofs in any configuration.

The GNSS satellites 140 may comprise suitable logic, circuitry and/or code that can be enabled to generate and broadcast suitable radio-frequency signals 189. The broadcast RF signals 189 may be received by the GNSS module 230 in the mobile device 130. The received broadcast RE signals 189 may be utilized to determine navigation information such as, for example, the GNSS based position, the associated uncertainty estimation, velocity, and timing information for the mobile device 130. In various implementations, the GNSS based position may be determined by location modes including but not limited to stand-alone and network assisted positioning modes.

Mobile device 130, APs 315, network server(s) 330, and positioning server(s) 325 maybe, enabled, for example for use with various communication network(s) 340 via wireless and/or wired communication links 399 (e.g., via one or more network interfaces). Examples of such communication network(s) 340 include but are not limited to a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

The APs 315, which may be wireless APs (WAPs), may be any type of terrestrial radio transmitter used in conjunction with mobile device 130 and mobile network 340 including, for example, WiFi/WLAN APs, femtocell nodes or transceivers, pico cell nodes or transceivers, WiMAX node devices, beacons, WiFi base stations, BLUETOOTH® transceivers, etc. Each of the APs 315 may be a moveable node, or may be otherwise capable of being relocated. The number of APs 315 shown in FIG. 3 is an example and not limiting and may include a single AP 315 or any number of APs 315 in any configuration. In various implementations, the APs 315 may send or receive signals including GNSS based position and associated uncertainty estimation information.

The network 340 may be serviced by one or more positioning server(s) 325. The positioning server(s) 325 can communicate with the network server(s) 330 via communications link 399. The positioning server(s) 325 may be implemented in or may be the same as the network server(s) 330. The positioning server(s) 325 may include a processor 324, a memory 323, GPU 329, and a GPU frame buffer 327.

The processor 324 can be an intelligent hardware device, e.g., a central processing unit (CPU) such as those made by ARM®, INTEL® Corporation, or AMD®, a microcontroller, an application specific integrated circuit (ASIC), etc. The processor 324 can, but need not necessarily include, one or more microprocessors, embedded processors, controllers, ASICs, digital signal processors (DSPs) and the like. The processor 324 could comprise multiple separate physical entities that can be distributed in the positioning server(s) 325. The term processor is intended to describe the functions implemented by the system rather than specific hardware.

In an implementation, the processor 324 may receive the GNSS based position and associated uncertainty estimation 193 for one or more mobile devices 130. In an implementation, the processor 324 may determine the GNSS based position and/or the associated uncertainty estimation 193 for one or more mobile devices 130 based at least in part on GNSS satellite signal information received from the one or more mobile devices 130. The processor 324 may send the GNSS based position and/or the associated uncertainty estimation 193 for a particular mobile device 130 to the particular mobile device 130. In an implementation, the processor 324 may receive GNSS based positions from one or more mobile devices 130 and send associated uncertainty estimations 193 to the one or more mobile devices 130. The processor 324 may store the GNSS based position and the associated uncertainty estimation 193 in memory 323 for use by GPU 323 and processor 324. The memory 323 may be any non-transitory computer-readable storage medium (or media) that stores functions as one or more instructions or code including but not limited to RAM, ROM, FLASH, disc drives, etc. and is not to be limited to any particular type of memory or number of memories, or type of media upon which memory is stored. Any processor 324 and/or memory 323 used or associated with the positioning server(s) 325 may be used or associated with any or all functions of the positioning server(s) 325.

The GPU 329 can be a graphics rendering device configured to implement graphics processing routines to generate a rasterized image. Examples of GPU 329 include, but are not limited to, a digital signal processor (DSP), a general purpose microprocessor, an application specific integrated circuit (ASIC), a field programmable logic array (FPGA), or another equivalent integrated or discrete logic circuitry. In various implementations, the graphics processing routines may be implemented in GPU 329 and/or processor 324 as software, firmware, one or more hardware units, or any combination thereof. The GPU 329 may store the generated rasterized image as a bitmap in the GPU frame buffer 327 and/or in memory 323. The GPU frame buffer 327 may comprise an on-chip buffer that may be part of the same integrated circuit, or chip, as the GPU 329. The GPU frame buffer 327 is communicatively coupled to the GPU 329 and to the processor 324.

Figure 5:
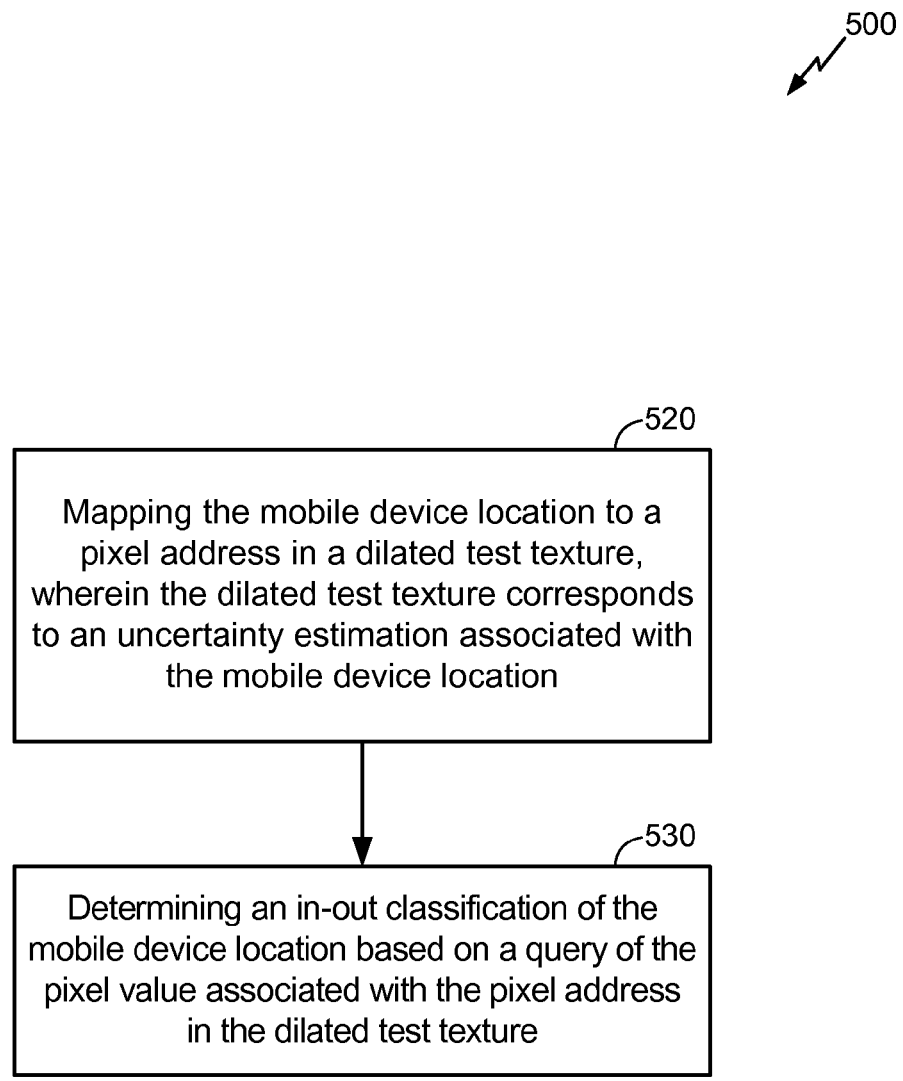
FIG. 5 is a flow diagram of a method for performing in-out classification of a mobile device location.

Referring to FIG. 5, with reference to FIGS. 2, 3, and 4, a method 500 for performing in-out classification for a mobile device location is shown. The method 500 is, however, an example only, and not limiting. The method 500 can be altered, e.g., by having stages added, removed, rearranged, combined, and/or performed concurrently. In an embodiment, the method 500 is implemented in the GPU 235 and/or the processor 220. For example, the mobile device location is determined by the GNSS module 230 of the mobile device 130. Performing in-out classification by the mobile device 130 of the mobile device location determined by the mobile device 130 may improve dynamic, real-time in-out classification. In an embodiment, the method 500 is implemented in the GPU 329 and/or the processor 324 of positioning server(s) 325. For example, the mobile device location is determined by the GNSS module 230 of the mobile device 130 and is sent to (for example, by the transceiver module 250) and received by the positioning server(s) 325. Performing in-out classification by the positioning server(s) 325 of the mobile device location received by the positioning server(s) 325 from the mobile device may extend battery life of the mobile device 130.

At stage 520, the method 500 includes mapping the mobile device location to a pixel address in a dilated test texture, wherein the dilated test texture corresponds to an uncertainty estimation associated with the mobile device location. For example, the GPU 235 maps the GNSS based mobile device location is mapped by the GPU 235 to a pixel in the dilated test texture (e.g., a morphologically dilated test texture) generated by a graphics pipeline implemented by the GPU 235.

Figure 6A:
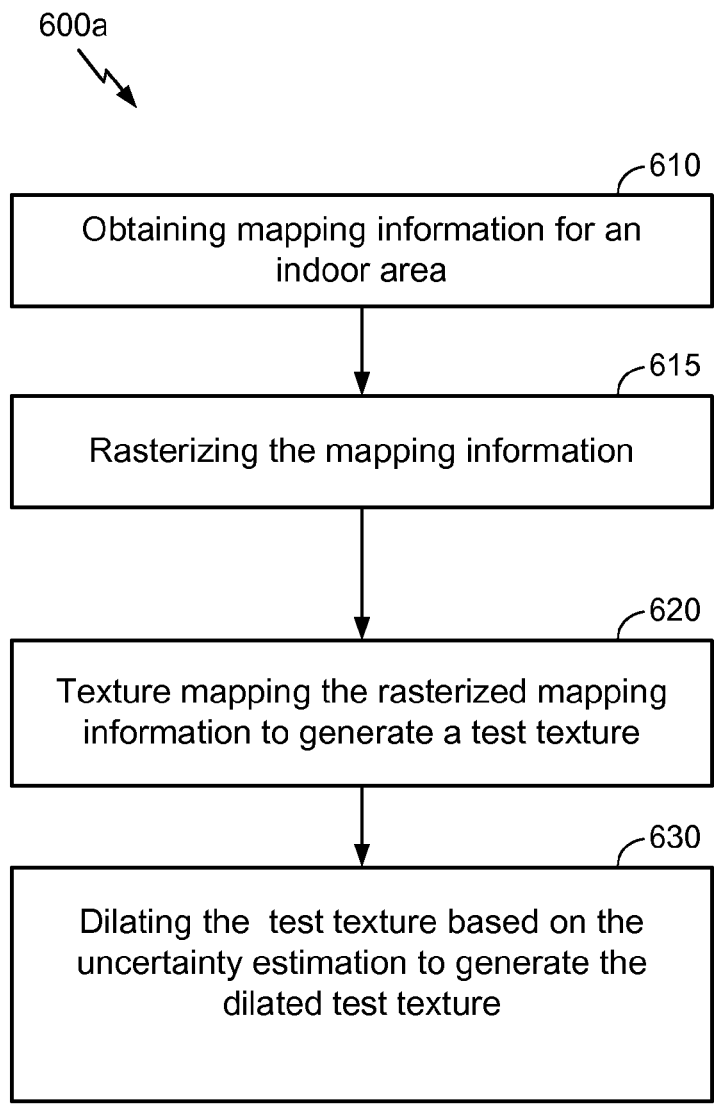
FIG. 6A is a flow diagram of a graphics processing method for generating a morphologically dilated test texture.

Referring to FIG. 6A, a graphics processing method 600*a* for generating the dilated test texture is shown. The method 600*a* is, however, an example only, and not limiting. The method 600*a* can be altered, e.g., by having stages added, removed, rearranged, combined, and/or performed concurrently. In various embodiments, the method 600*a* can be implemented in the GPU 235 and/or the processor 220 of mobile device 130 and/or the GPU 329 and/or the processor 324 of positioning server(s) 325.

Figure 7:
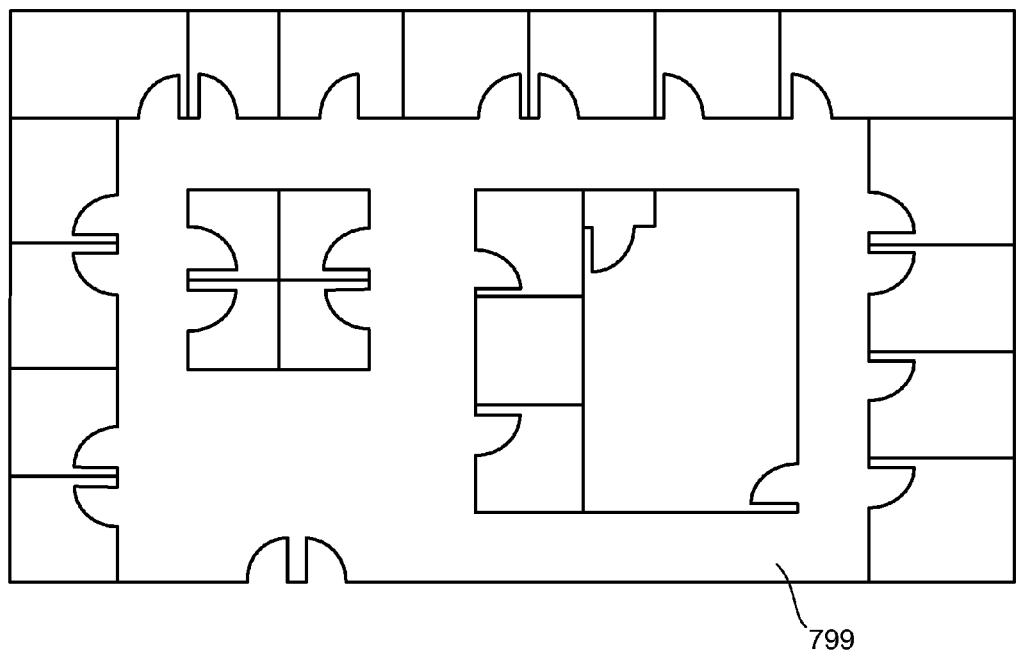
FIG. 7 is an example of mapping information for an indoor area.

At stage 610, the method 600*a* includes obtaining mapping information for an indoor area. For example, the mapping information 799, as shown in FIG. 7, is obtained (e.g., downloaded) for the indoor area 320 by the GPU 235 based on the identity of the indoor area 320. The identity of the indoor area 320 may be the name of a shopping mall, an office building, a residential building, etc. For example, when the mobile device 130 is within or proximate to the indoor area 320, one or more signals including AP MAC IDs from one or more APs 315 that are associated with the indoor area 320 are received by the mobile device 130. An almanac on a positioning server 325 or network server(s) 330 can include a directory, list, or other database which associates the identity of the indoor area 320 with the AP MAC IDs. Further, the database may associate the GNSS based position of the mobile device 130 with the identity of the indoor area. The mapping information 799 may be stored at, for example, network server(s) 330 or positioning server(s) 325 and may be accessible to the mobile device 130 through the wireless network(s) 340 or, for example, through selection of an Internet based URL based on the identity of the indoor area. The mapping information 799 may be available in a graphic form for display to a user of the mobile device 130 or it may be available in a data format suitable for positioning calculations or other calculations done by the mobile device 130 or the positioning server(s) 325. The mapping information 799 may be a data file in various formats including, for example, an image format, CAD format, DXF format, XML format, GML format, or some combination thereof, etc. The data file may be acquired a picture of a displayed map, a scanned printed map, a copy of an image presented on the internet and so forth, just to name a few examples. The mapping information 799 may show details of structural features, (e.g., doors, hallways, entry ways, interior walls, courtyards, parking lots, gardens, balconies, roofs, exterior walls, windows, etc.), points of interest (e.g., bathrooms, room names, store names, etc.), and routing information.

At stage 615, the method 600*a* includes rasterizing the mapping information. For example, mapping information 799 is rasterized by graphics processing routines, referred to as a graphics pipeline, implemented in GPU 235. The graphics pipeline is comprised of standard graphics library code modules that perform functions similar to those ordinarily attributed to the standard graphics library code modules (for example, OPENGL® ES 4.3 specification released on Aug. 6, 2012 and developed by the KHRONOS® Group Incorporated and MICROSOFT® DIRECTX® graphics library). In general, the graphics pipeline can rasterize three-dimensional graphics data in order to render the data in two-dimensions as a rasterized image. The rasterized image may be the bitmap stored, for example, in GPU frame buffer 240.

The mapping information 799 is rasterized with a particular scale. For example, the scale can refer to a particular correspondence between a physical dimension and a number of pixels (for example, one pixel may correspond to a certain number of millimeters in physical space). The scale can be determined by one or more of the desired resolution of the rasterized mapping information, the desired accuracy of the in-out classification, the overall size of the mapping information, or the array size allocated for particular mapping information in the GPU frame buffer 240. In various implementations, the scale may be pre-determined or may be adjusted dynamically. Due to parallel processing, the relatively high processing speeds of the GPU 235 as compared to a CPU can allow dynamic adjustment of the scale.

Optionally, at stage 615, the silhouette (i.e., the perimeter) of the mapping information 799 is tested by one or more code modules of the graphics pipeline to determine if the silhouette is closed (e.g., continuous and without gaps). If the silhouette is not closed, a two-step morphological closing operation (i.e., morphological dilation followed by morphological erosion, as described in detail below) is applied to the mapping information to produce a closed silhouette in the rasterized image.

Figure 8A:
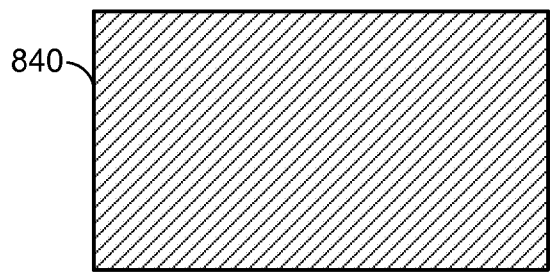
FIG. 8A is a schematic diagram of a test texture for an indoor area.

At stage 620, the method 600*a* includes texture mapping the rasterized mapping information to generate a test texture. For example, texture mapping is implemented by the fragment shader graphics code module of the graphics pipeline of GPU 235 to generate the test texture from the rasterized mapping information. The test texture is stored in, for example, GPU frame buffer 240 and/or displayed on, for example, the display screen 225. The test texture, as used herein, refers to a rasterized map, image, etc. for which a numerical value has been assigned to each frame buffer address according to a particular texture. For example, to generate a binary test texture, the texture mapping assigns the numerical value of "1" or "0" to each frame buffer address. Because each frame buffer address of, for example, the GPU frame buffer 240 may correspond to a particular pixel of, for example, the display screen 225, the terms frame buffer address, pixel address, and pixel may be interchangeable. Similarly, the numerical value associated with each frame buffer address may be referred to interchangeably as a value associated with a pixel address or a pixel value. In an implementation, the pixel values are written to or read from the GPU frame buffer 240 by the GPU 235. An example of a binary test texture 840 is shown in FIG. 8A. In this example, pixels inside of the closed perimeter of the indoor area (i.e., as indicated by the cross-hatched area in FIG. 8A) have a pixel value of "1" and pixels outside of the closed perimeter of the indoor area have a pixel value of "0". In an alternative embodiment, pixels inside of the closed perimeter of the indoor area have a pixel value of "0" and pixels outside of the closed perimeter of the indoor area have a pixel value of "1".

At stage 630, the method 600a includes dilating the test texture based on the uncertainty estimation to generate the dilated test texture. For example, the test texture 840 is dilated by the fragment shader graphics code module of the graphics pipeline implemented in GPU 235. The graphics processing operations can include mathematical morphological operations, for example, a morphological dilation operation and a morphological erosion operation. In general, the morphological dilation operation, on a test texture A by a structuring element B, may be expressed, as an example not limiting of the invention, using the following equation:

$$A \oplus B = \bigcup_{b \in B} A_b.$$

In general, the morphological erosion operation, on the test texture A by the structuring element B, may be expressed, as an example not limiting of the invention, using the following equation:

$$A \ominus B = \bigcap_{b \in B} A_{-b}.$$

As expressed by the above equations, the morphological operations convolute the test texture A with the structuring element B. The structuring element B may be any geometric shape. For example, the structuring element B may be a circle. The morphological operation can operate, in turn, on each pixel value of the test texture A. The pixel that is the object of the morphological operation is a target pixel. As a result of the morphological dilation operation, the target pixel value is the maximum pixel value of all of the pixels in the neighborhood of the target pixel (i.e., those pixels overlapped by the structuring element B centered on the target pixel). For example, if any of the pixels in the neighborhood of the target pixel has the pixel value of "1" (e.g., a black pixel), the target pixel value is "1". Thus, the morphological dilation operation can cause the black areas of the test texture to expand. Conversely, as a result of the morphological erosion operation, the target pixel value is the minimum value of all of the pixels in the neighborhood of the target pixel. For example, if any of the pixels in the neighborhood of the target pixel has a pixel value of "0" (i.e., a white pixel), the target pixel value is "0". Thus, the morphological erosion operation can cause black areas of the test texture to contract.

Figure 8B:
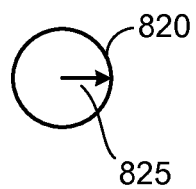
FIG. 8B is a schematic diagram of a structuring element based on an associated uncertainty estimation.
Figure 8C:
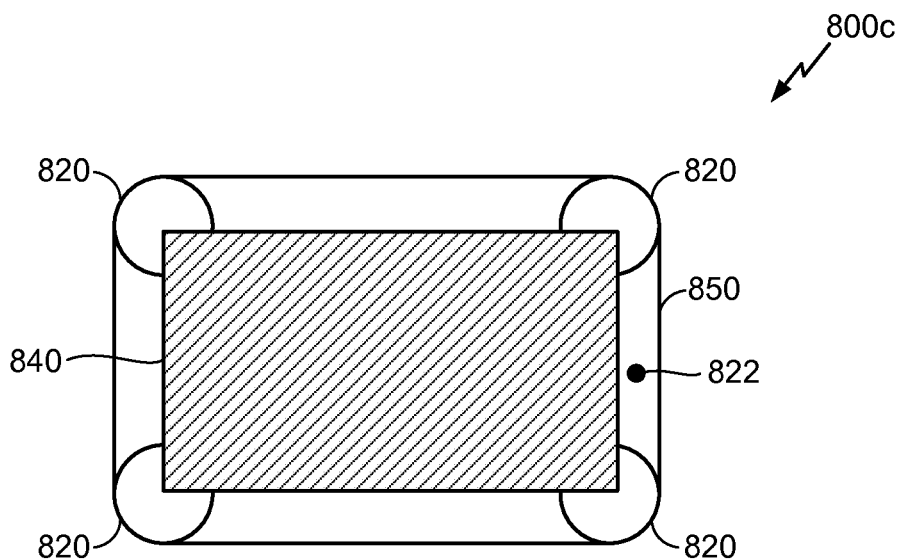
FIG. 8C is a schematic diagram of a morphologically dilated test texture based on a structuring element.

The structuring element described above is determined by the fragment shader graphics code module based on the uncertainty associated with the mobile device location. For example, referring to FIGS. 8B and 8C, schematic diagrams are shown of the structuring element based on the associated uncertainty estimation and the morphologically dilated test texture. In FIG. 8B, the structuring element 820 is shown, for example, as a circle and a radius of the structuring element 820 equals the associated GNSS uncertainty estimation 825. The shape of the structuring element 820 may be a two-dimensional polygon and may be determined based on directional variation (e.g., the isotropy or anisotropy) of the associated uncertainty estimation. The circular shape of structuring element 820 is an example and is not limiting of the invention. For a particular shape of structuring element, the associated GNSS uncertainty estimation 825 may determine a particular dimension of the structuring element. The particular dimension of the structuring element may be equal to or a function of a particular dimension of the uncertainty polygon. For example, the radius of the two-dimensional uncertainty polygon or of the three-dimensional uncertainty polygon may determine the radius of the structuring element. The structuring element is determined by the GPU 235 and/or the processor 220 and stored in memory 245 of the mobile device and/or determined by the GPU 329 and/or the processor 324 and stored in memory 323 of the positioning server(s) 325. In FIG. 8C, the test texture 840 is convoluted with the structuring element 820 to generate the morphologically dilated test texture 850. The pixels outside of the morphologically dilated test texture 850 can correspond to a pixel value of "0" (e.g., white) and the pixels inside of the morphologically dilated test texture 850 can correspond to a pixel value of "1" (e.g., black). In an alternative implementation, the pixels outside of the test texture 850 can correspond to a pixel value of "1" and pixels inside of the test texture 850 can correspond to a pixel value of "0".

Referring again to FIG. 6A, stage 630 of method 600a optionally includes storing the morphologically dilated test texture 850 together with the uncertainty estimation used to determine the structuring element. For example, the radius or other dimension of the structuring element 820 and the morphologically dilated test texture 850 are stored by the GPU 235 in memory 245. In an implementation, the radius or other dimension of the structuring element 820 is stored as metadata of the stored morphologically dilated test texture 850.

Figure 9:
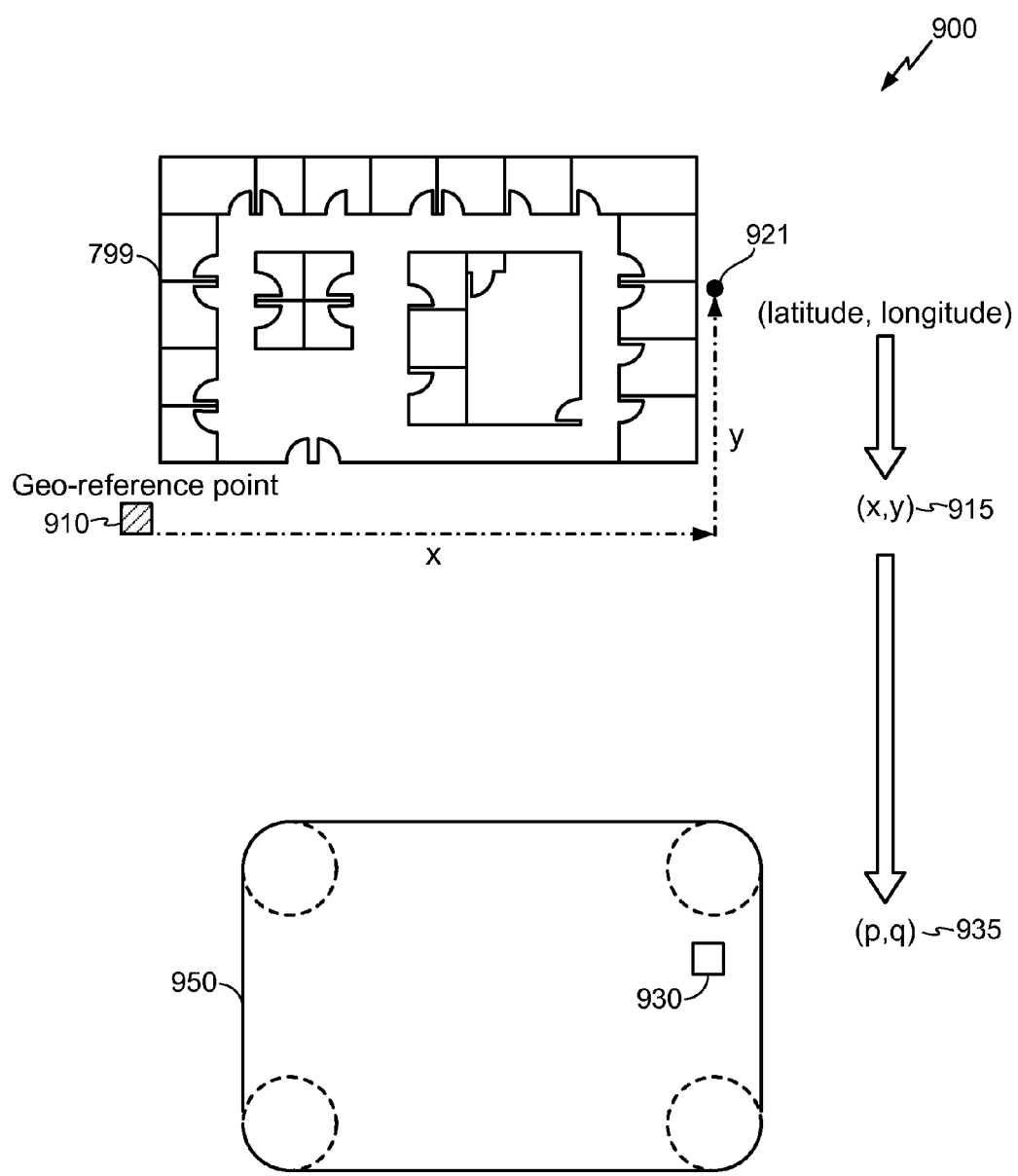
FIG. 9 is a schematic diagram of a GNSS based position mapped to a location in a morphologically dilated test texture.

Referring again to stage 520 of FIG. 5, the mobile device location is mapped, for example by the GPU 235, to a pixel address in the morphologically dilated test texture. In an implementation, the morphologically dilated test texture is generated in response to receiving or determining the mobile device location. In an implementation, the morphologically dilated test texture is previously stored and retrieved from the memory 245 and/or memory 323. As shown schematically, for example, in FIG. 9, mapping the mobile device location is determining a correspondence between the global coordinates (x, y) 915 (i.e., latitude and longitude) of the GNSS based mobile device position 921 and a pixel address (p, q) 935 in the morphologically dilated test texture 950. In an embodiment, the global coordinates (x, y) 915 in mapping information 799 are determined relative to a geo-reference point 910 included in the mapping information 799. The pixel address (p,q) 935 (e.g., pixel coordinates, frame buffer address in the GPU frame buffer 240, frame buffer address in the GPU frame buffer 327, storage location in memory 245, or storage location in memory 323) is associated with a particular pixel 930 in the morphologically dilated test texture.

At stage 530, method 500 includes determining an in-out classification of the mobile device location based on a query of the pixel value associated with the pixel address in the dilated test texture. For example, the pixel value of the particular pixel address corresponding to the mobile device location is queried by the GPU 235 and/or the processor 220 and the in-out classification of the mobile device location is determined by the GPU 235 and/or the processor 220. The particular pixel address refers to a particular pixel address in the morphologically dilated test texture that is stored, for example, in the GPU frame buffer 240. The pixel value associated with the pixel address (p, q) 935 in the morphologically dilated test texture may be a "1" or a "0". In an implementation, if the queried value is "1", then the in-out classification of the GNSS based mobile device position 921 is "in" (e.g., inside of the indoor area 320). If the queried value is "0", then the in-out classification of the GNSS based mobile device position 921 is "out" (e.g., outside of the indoor area 320). In an alternative implementation, the queried value of "0" can correspond to "in" and the queried value of "1" can correspond to "out". A particular mobile device position classification (e.g., "in" or "out"), may not imply or represent physically interior or exterior locations with regard to the indoor area. For example, referring to FIG. 1A, certain physical locations outside of the exterior boundary 120 but under the roof 105 may be classified as "in". As another example, referring to FIG. 1B, certain physical locations outside of the exterior boundary 120 but in the courtyard 118 may be classified as "in". The in-out classification can classify the GNSS based position of the mobile device 130 based on the query of the location value at stage 530 of the in-out classification method 500 regardless of the spatial relationship between physical structures of the indoor area and the physical location 190 of the mobile device 130. In an implementation, the pixel value is queried by the GPU 329 and/or the processor 324, the in-out classification of the mobile device location is determined by the GPU 329 and/or the processor 324. The in-out classification may be sent by the positioning server(s) 325 to the mobile device 130 and/or stored in memory 323 and/or memory 245.

The described in-out classification can have an O(1) time complexity where O(1) represents Big-O Notation. The time-complexity estimates the running time associated with a particular processing code. The argument of "1" in the Big-O Notation defines the time-complexity as a constant time complexity and indicates a shorter running time for the query than a query with a higher order argument of the Big-O Notation.

Figure 6B:
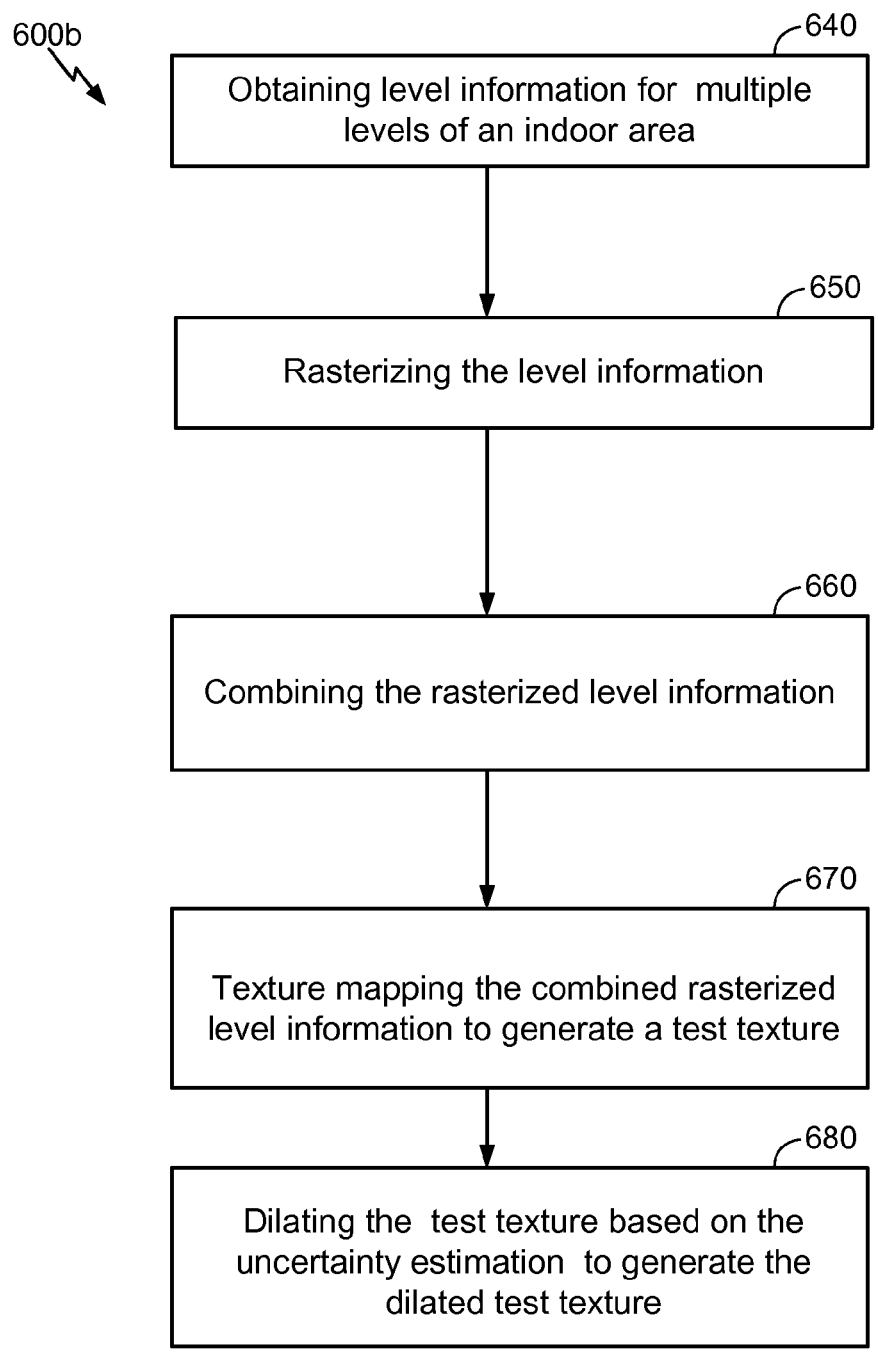
FIG. 6B is a flow diagram of a graphics processing method for generating a morphologically dilated test texture for multiple levels of an indoor area.

Referring to FIG. 6B, a graphics processing method 600b for generating the morphologically dilated test texture for multiple levels of an indoor area is shown. The method 600b is, however, an example only, and not limiting. The method 600b can be altered, e.g., by having stages added, removed, rearranged, combined, and/or performed concurrently. In an embodiment, the method 600b can be implemented in the GPU 235, the processor 220, or a combination thereof of mobile device 130. In an embodiment, the method 600b can be implemented in the GPU 329, the processor 324 or a combination thereof.

At stage 640, the method 600b includes obtaining level information for multiple levels of an indoor area. For example, level information is obtained (e.g., downloaded) for multiple levels (e.g., levels 405, 410, and 415 in FIG. 4) of the indoor area 320 by the GPU 235 based on the identity of the indoor area 320. The level information is mapping information for a particular level (e.g., a floor, story, etc.) of the indoor area. Obtaining level information may include obtaining level information for each level of the multiple levels or for at least two levels of the multiple levels. The multiple levels can include a roof (e.g., the level 405 of FIG. 4). The level information may include roof information (e.g., mapping information which may include roof dimension information, roof geometry information, roof configuration information, etc. for one or more roofs of the indoor area). The level information may be obtained, for example, in a manner similar to obtaining the mapping information 799 at the stage 610 of the method 600a. The level information may be in a format similar to that described above with regard to the mapping information 799.

Figure 10A:
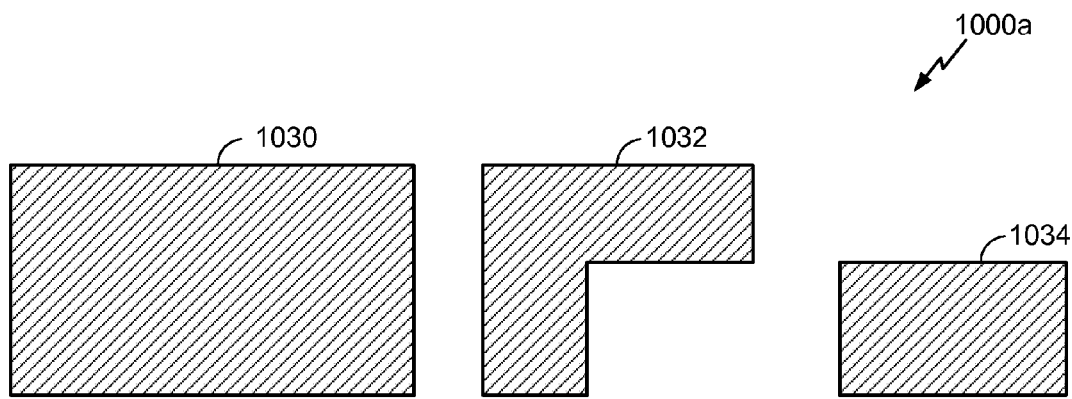
FIG. 10A is a schematic diagram of a set of rasterized level information for multiple levels of an indoor area.

At stage 650, the method 600b includes rasterizing the level information. For example, level information for multiple levels of the indoor area is rasterized by the graphics pipeline implemented in GPU 235. Referring to FIG. 10A with further reference to FIG. 4, an example of a set 1000a of rasterized level information is shown. In this example, not limiting of the invention, the rasterized level information 1030 may correspond to the roof level 405, rasterized level information 1032 may correspond to the level 415, and rasterized level information 1034 may correspond to the level 410. The level information for the multiple levels can be rasterized with a particular scale as described above. The scale may be the same for each of the multiple levels. Optionally, at stage 650 the silhouette of the level information is tested to determine if the silhouette is closed. If the silhouette is not closed, a two-step morphological closing operation is applied to the level information to produce a closed silhouette in the rasterized image.

Figure 10B:
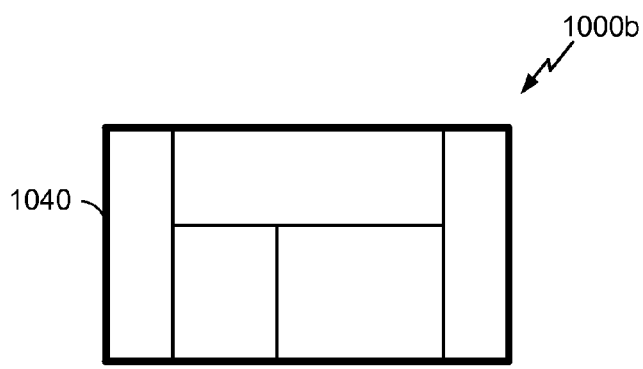
FIG. 10B is a schematic diagram of a single test texture for combined rasterized level information for multiple levels of an indoor area.

At stage 660, the method 600b includes combining the rasterized level information. For example, the rasterized level information is combined using the graphics pipeline implemented in GPU 235. Combining the rasterized level information includes overlaying and aligning the level information according the geometry of the indoor area. Further, combining the rasterized level information may include determining an outermost perimeter for the overlaid multiple levels. An example of rasterized combined level information 1000b is shown schematically in FIG. 10B. For clarity, to illustrate the overlay of the rasterized level information for the multiple levels, the perimeters of the rasterized level information for each level (e.g., 1030, 1032, and 1034) are shown. The thick solid line 1040 indicates the outermost perimeter of the combined rasterized level information for the multiple levels.

At stage 670, the method 600b includes texture mapping the combined rasterized level information to generate a test texture. For example, similarly to the stage 620 of FIG. 6A as described above, the test texture is generated by the fragment shader graphics code module of the graphics pipeline implemented in GPU 235.

Figure 10C:
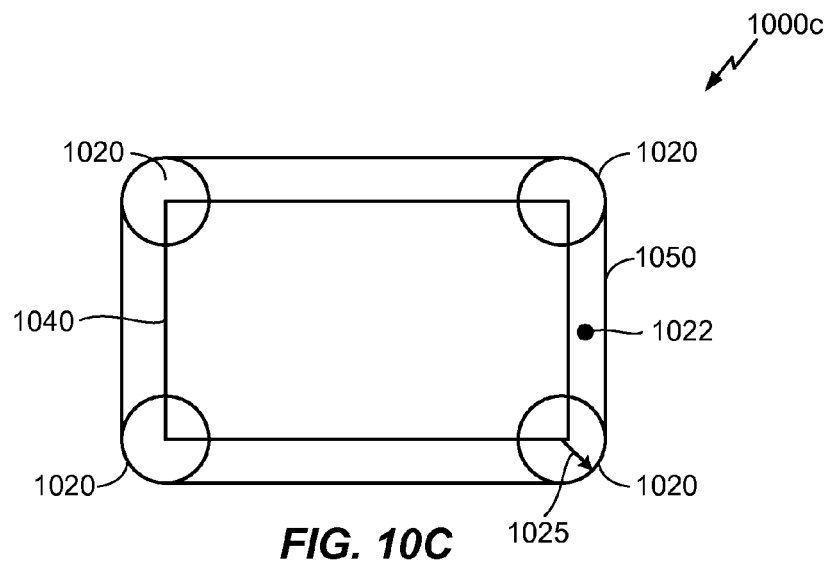
FIG. 10C is a schematic diagram of a morphologically dilated test texture based on a dilation circle for multiple levels of an indoor area.

At stage 680, the method 600b includes dilating the test texture based on the uncertainty estimation to generate the dilated test texture. For example, similarly to the stage 630 of the method 600a described above and referring to FIG. 10C, the test texture 1040 is dilated by the fragment shader graphics code module of the graphics pipeline implemented in GPU 235. As shown schematically in FIG. 10C, the test texture 1040 is convoluted with the structuring element 1020 (e.g., a circle or other shape with a radius or other dimension determined by the uncertainty estimation associated with the GNSS based mobile device location) to generate the morphologically dilated test texture 1050. In various embodiments, the morphologically dilated test texture 1050 is stored in the memory 245 of the mobile device 130 and/or the memory 323 of the positioning server(s) 325.

Other embodiments are within the scope and spirit of the invention. For example, due to the nature of software, functions described above can be implemented using software, hardware, firmware, hardwiring, or combinations of any of these. Features implementing functions may also be physically located at various locations, including being distributed such that portions of functions are implemented at different physical locations.

Those of skill in the art would understand that information and signals may be represented using any of a variety of different technologies and techniques. For example, data, instructions, commands, information, signals, and symbols that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and algorithm steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium know in the art. A storage medium may be coupled, for example, to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more design examples, the functions described may be implemented in hardware, software, firmware, middleware, microcode, hardware description languages, or any combination thereof. When implemented in software, firmware, middleware, or microcode, the functions may be stored on or transmitted over as one or more instructions or code on a non-transitory computer-readable medium such as a computer storage medium. Processors may perform the described tasks.

Computer-readable media includes both computer storage media and communication media including any medium that facilitates transfer of a computer program from one place to another. A computer storage medium includes any medium that facilitates transfer of a computer program from one place to another. A computer storage media may be any available media that can be accessed by a general purpose or special purpose computer. By way of example, and not limitations, such computer-readable media can comprise RAM, ROM, EEPROM, CD-RIM or other optical disk storage, magnetic disk storage or other magnetic storage devices, or any other medium that can be used to carry or store desired program code means in the form of instructions or data structures and that can be accessed by a general-purpose or special purpose computer, or a general purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or mobile technologies such as infrared, radio, and microwave, then the coaxial cable, fiber optic cable, twisted pair, DSL, or mobile technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

The methods, systems, and devices discussed above are examples. Various alternative configurations may omit, substitute, or add various procedures or components as appropriate. Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not limit the scope of the claims. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Further, while the description above refers to the invention, the description may include more than one invention.

What is claimed is:

1. A method of classifying a mobile device location implemented by one or more processors, a graphics processing unit (GPU), or a combination thereof comprising:
   storing, by the one or more processors, the GPU, or the combination thereof, a dilated test texture in a GPU frame buffer, the dilated test texture being rasterized mapping information morphologically dilated according to a morphological dilation operation based on an uncertainty estimation associated with the mobile device location;
   mapping, by the one or more processors, the GPU, or the combination thereof the mobile device location to a particular pixel address in the GPU frame buffer associated with the dilated test texture;
   determining, by the one or more processors, the GPU, or the combination thereof, an in-out classification of the mobile device location based on a query of a pixel value associated with the particular pixel address in the GPU frame buffer associated with the dilated test texture; and
   outputting, by the one or more processors, the GPU, or the combination thereof, the in-out classification of the mobile device location.

2. The method of claim 1 further comprising receiving the mobile device location and the uncertainty estimation.

3. The method of claim 1 further comprising determining the mobile device location and the uncertainty estimation.

4. The method of claim 1 further comprising:
   obtaining mapping information for an indoor area;
   rasterizing the mapping information;
   texture mapping the rasterized mapping information to generate a test texture; and
   dilating the test texture according to the morphological dilation operation by convoluting a structuring element based on the uncertainty estimation with the test texture.

5. The method of claim 4 further comprising:
   determining a dimension of the structuring element based on the uncertainty estimation associated with the mobile device location.

6. The method of claim 4 further comprising:
   rasterizing level information wherein the mapping information comprises the level information for multiple levels of the indoor area;
   combining the rasterized level information; and
   texture mapping the combined rasterized level information to generate the test texture.

7. The method of claim 6 further comprising:
   rasterizing the level information wherein the level information includes roof information.

8. The method of claim 1 comprising:
   retrieving, from a memory device and based on the uncertainty estimation, the dilated test texture.

9. An apparatus for classifying a mobile device location, the apparatus comprising: one or more processors coupled with a graphics processing unit (GPU), the one or more processors and the GPU configured to:
   store a dilated test texture in a GPU frame buffer, the dilated test texture being rasterized mapping information morphologically dilated according to a morphological dilation operation based on an uncertainty estimation associated with the mobile device location;
   map the mobile device location to a particular pixel address in the GPU frame buffer associated with the dilated test texture;
   determine an in-out classification of the mobile device location based on a query of a pixel value associated with the particular pixel address in the GPU frame buffer associated with the dilated test texture; and
   output the in-out classification of the mobile device location.

10. The apparatus of claim 9 wherein the one or more processors are further configured to receive the mobile device location and the uncertainty estimation.

11. The apparatus of claim 9 wherein the one or more processors are further configured to determine the mobile device location and the uncertainty estimation.

12. The apparatus of claim 9 wherein the one or more processors, the GPU, or the combination thereof are further configured to:
    obtain mapping information for an indoor area;
    rasterize the mapping information;
    texture map the rasterized mapping information to generate a test texture; and
    dilate the test texture according to the morphological dilation operation by convoluting the test texture with a structuring element based on the uncertainty estimation with the test texture.

13. The apparatus of claim 12 wherein the one or more processors, the GPU, or the combination thereof are further configured to:
    determine a dimension of the structuring element based on the uncertainty estimation associated with the mobile device location.

14. The apparatus of claim 12 wherein the mapping information comprises level information for multiple levels of the indoor area and wherein the one or more processors, the GPU, or the combination thereof are further configured to:
    rasterize the level information;
    combine the rasterized level information; and
    texture map the combined rasterized level information to generate the test texture.

15. The apparatus of claim 14 wherein the level information includes roof information.

16. The apparatus of claim 9 wherein the one or more processors, the GPU, or the combination thereof are further configured to:
    retrieve the dilated test texture, from a memory device, based on the uncertainty estimation.

17. A method of classifying a mobile device location, the method implemented by a mobile device, comprising:

sending, by the mobile device, the mobile device location and an uncertainty estimation associated with the mobile device location;

receiving, by the mobile device, an in-out classification of the mobile device location wherein the in-out classification of the mobile device location is based on a query of a pixel value associated with a particular pixel address in a graphics processing unit frame buffer associated with a dilated test texture, the dilated test texture being rasterized mapping information morphologically dilated according to a morphological dilation operation based on the uncertainty estimation associated with the mobile device location; and storing, by the mobile device, the in-out classification of the mobile device location.

18. The method of claim 17 wherein a structuring element of the morphological dilation operation corresponds to the uncertainty estimation associated with the mobile device location.

19. The method of claim 17 wherein the rasterized mapping information corresponds to mapping information for an indoor area associated with the mobile device location.

20. The method of claim 19 wherein the mapping information comprises level information for multiple levels of the indoor area.

21. The method of claim 20 wherein the level information includes roof information.

22. An apparatus for classifying a mobile device location, the apparatus comprising one or more processors configured to:

send the mobile device location and an uncertainty estimation associated with the mobile device location;

receive an in-out classification of the mobile device location wherein the in-out classification of the mobile device location is based on a query of a pixel value associated with a particular pixel address in a graphics processing unit frame buffer associated with a dilated test texture, the dilated test texture being rasterized mapping information morphologically dilated according to a morphological dilation operation based on the uncertainty estimation associated with the mobile device location; and store the in-out classification of the mobile device location.

23. The apparatus of claim 22 wherein a structuring element of the morphological dilation operation corresponds to the uncertainty estimation associated with the mobile device location.

24. The apparatus of claim 22 wherein the rasterized mapping information corresponds to mapping information for an indoor area associated with the mobile device location.

25. The apparatus of claim 24 wherein the mapping information comprises level information for multiple levels of the indoor area.

26. The apparatus of claim 25 wherein the level information includes roof information.

* * * * *